Figure 1:
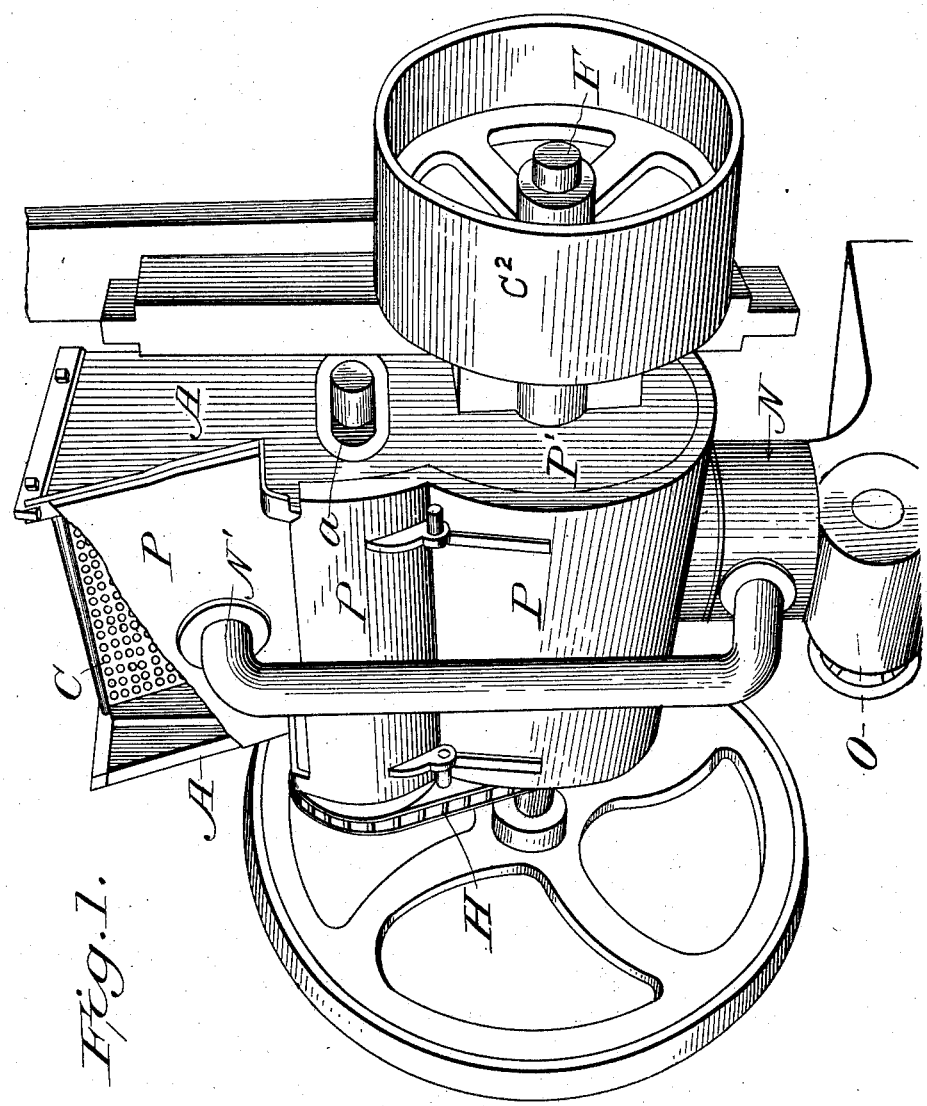

M. C. PETERS.
REDUCING MILL.
APPLICATION FILED APR. 26, 1909.

1,015,246.

Patented Jan. 16, 1912.
3 SHEETS—SHEET 1.

Witnesses
C. H. Walker
A. C. Heap.

Inventor
Milton C. Peters.
By P. Walter Fowler
his Attorney

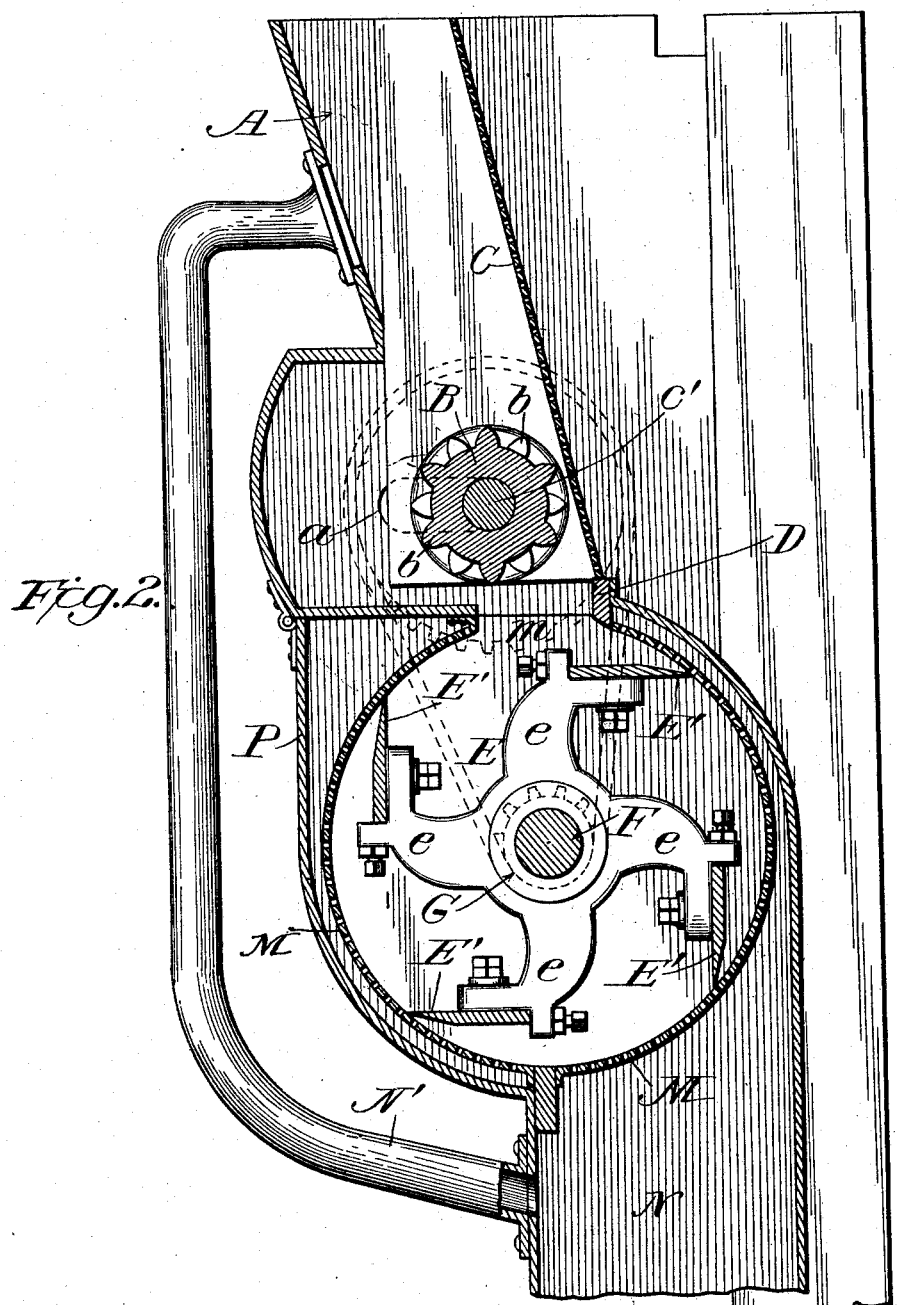

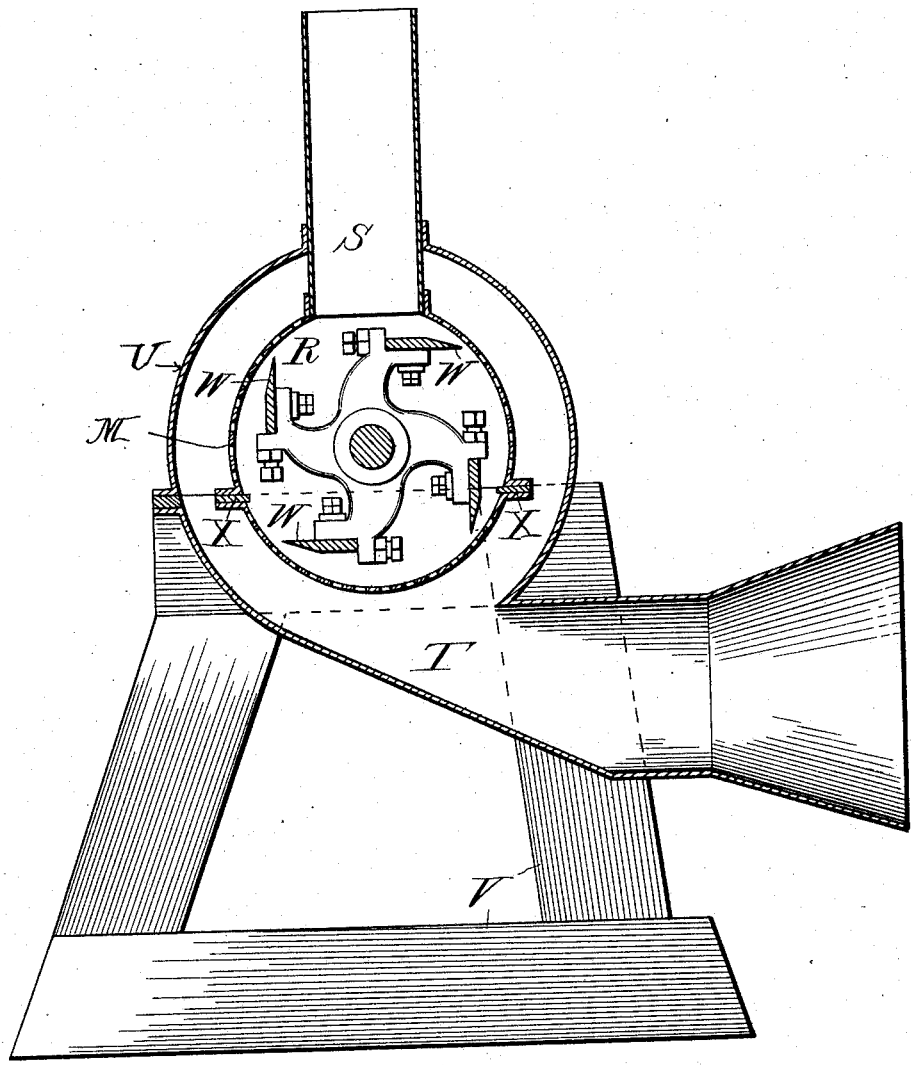

UNITED STATES PATENT OFFICE.

MILTON C. PETERS, OF OMAHA, NEBRASKA.

REDUCING-MILL.

1,015,246.  Specification of Letters Patent.  Patented Jan. 16, 1912.

Application filed April 26, 1909. Serial No. 492,123.

*To all whom it may concern:*

Be it known that I, MILTON C. PETERS, a citizen of the United States, residing at Omaha, in the county of Douglas and State of Nebraska, have invented certain new and useful Improvements in Reducing-Mills, of which the following is a specification.

My invention relates to a new and useful machine for reducing alfalfa or other hay, clover, or like forage into a coarse meal or of leaves and stems, designed as a stock food and as a food for fowls, and my invention consists of the parts, and the arrangements, construction and combination of parts which I will hereinafter describe and claim.

In the accompanying drawings forming part of this specification and in which similar reference characters indicate like parts in the several views:—Figure 1 is a perspective view of a reducing mill embodying my invention, Fig. 2 is a vertical longitudinal sectional view of the same, Fig. 3 is a sectional view of a reducing mill of somewhat modified construction.

In carrying out my invention, I may arrange the machine in any desired position upon a suitable foundation or support, it being immaterial from a practical standpoint whether the machine is arranged vertically as on Fig. 1, and with a vertical feed and discharge or horizontal (Fig. 3) with a vertical or horizontal feed; for the purpose of illustration, I show machines of both types appropriately mounted on a base or support of suitable construction adapted to sustain the weight of the machine and the vibrations incident to the operation of said machine.

The machine shown (Fig. 1) comprises a frame of suitable design and strength having parallel sides, A, the central portions of which are provided with elongated slots, $a$, for the journal ends of a roller, B, which serves to feed the hay or other material to the cutting mechanism, which I will hereinafter describe.

The feed end of the machine may be provided with a screen bottom C, of any desired form adapted to provide an escape for some of the dust and fine particles usually present in alfalfa or other hay or forage, said feed-end of the machine being preferably, somewhat contracted inwardly toward the feed roller, B, as shown by the converging sides in Fig. 1. This roller, B, is armed or provided with spurs or points, $b$, on its circumference adapted to positively engage the hay or forage and draw it inward and feed it to the devices which chop the material into what I term a coarse meal, which may be composed of alfalfa leaves and stems. Behind the feed roller, B, or, to be more exact in the vertical type of machine shown in Figs. 1 and 2 below the said roller, is suitably arranged a stationary cutter bar, D, over which the hay or material is fed by the roller; operating in conjunction with the bar, D, is a rotary cutter, E, having arms $e$, with cutter bars or blades E', adapted to sweep past the edge of the stationary cutter, D, and cut into short lengths the material being fed thereover by the aforesaid feed roller.

The rotary cutter is mounted upon a shaft F, having a sprocket wheel G, from which a chain H, extends to a sprocket-wheel, H', on the shaft C', of the feed roller. Power to operate the cutter is obtained through a band pulley $C^2$ on the shaft F. The foregoing arrangement of driving connections is, however, optional, as I may use any well known mechanism for operating the cutter without departing from the salient features of my invention.

One of the prominent features of my invention is the surrounding of the rotary cutter by a screen M, of any well known form and material, arranged concentric with the axis of the rotary cutter and close to the circular path described by the cutting edges of the blades E', said screen having an opening $m$, in its side adjacent to the feed roller B, to permit the free ingress of the hay or material from the feed-roller to the stationary cutter-bar D. From this described arrangement, it will be apparent that the cutter-blades E', chop the hay as it passes over the edge of the cutter-bar, D, and the particles so cut fall directly into the casing or chamber inclosed by the circular screen and are agitated therein, whereby the particles which have been reduced fine enough to pass through the meshes or perforations of said screen pass to the outside and into a chamber N, and which chamber is connected to the air trunk. This conveyer may have a fan case O, connecting with the chamber N, and with a chute or conduit (not shown) along which the reduced hay-particles are carried, by suction or blast, as desired, and delivered into some suitable receiver stationed at a desired point.

The described screening of the product occurs substantially simultaneously with the cutting thereof, the screening being facilitated by the suction produced in the chamber and screen, and, in the vertically-arranged type of machine shown in Fig. 1 by the force of gravity. It is also, apparent that the cutter-blades will tend to lift and throw back onto the cutter bar any large pieces of material which might enter the chamber of the screen and thereby further reduce these particles and until they reach a size adapting them to pass through the screen.

In order that the dust arising from the cutting of the material may be confined as nearly as possible to the material, and to assist in producing a suction effect in or through the machine, I prefer to incase the screen, the feed roller and top or front of the machine in a substantially closed housing or cover P; the ends of the screen are also closed as shown at P′, thus providing a closed chamber for the rotary cutter to operate in.

In some instances it is desirable to remove from the mass of hay as it enters the machine the loose, fine leaves or light portions, therefore I show a branch N′, of the air chamber N extending over the machine and leading to a point near the feed end thereof and piercing the housing or cover P so as to connect with the upper part of the device above the feed roller in such manner that the aforesaid light particles will be drawn off by the suction produced in the branch pipe N′, and will be carried into the main portion of the air-trunk to be mixed with the chopped product which has passed the screen.

By the means described, I am enabled to reduce alfalfa leaves and stems, clover or other product, in an effective and simple manner, and also to screen the product as the cutting progresses, the step of screening being done substantially simultaneously with the cutting and in the presence of the cutting blades; in fact the screen serves as a holder for the cut particles until the blades so reduce the particles that they can escape through the meshes or openings in the screen. The result is a chop food the bulk of which is formed of particles of substantially uniform size, these particles, in the case of alfalfa-hay, clover, etc., representing the leaves and stems of the original product.

In Fig. 3, the rotary cutter operates in a suitable inclosing screen-chamber R one portion of which connects with a feed-inlet, S, while another and lower portion connects with a chute T, for leading the separated material from the machine and which outlet may well represent the suction chamber of Figs. 1 and 2. The screen of Fig. 3 is inclosed by the housing U, to form the air chamber, and the arrangement is such that the operation does not materially depart from that described for the machines of Figs. 1 and 2. The machine (Fig. 3) is supported horizontally upon a suitable frame work V and the cutting blades W operate in conjunction with one or more fixed cutter bars X, as shown, to reduce the material as before described.

Having thus described my invention what I claim as new and desire to secure by Letters Patent is:—

1. In a reducing mill of the character described, the combination of a casing having a feed inlet at one end and an air chamber at the other end into which reduced material is delivered, a screen and a contained revoluble rotary cutter within the casing intermediate of the feed inlet and the air chamber, the inlet end of the casing having a foraminous wall over which the material passes and by which it is partially screened, a feed roller for delivering material into the screen, and an air conducting pipe connecting the feed end of the chamber in advance of the feed roll with the air chamber at the opposite end of the casing whereby the leaves and light particles of matter may be conducted directly through said pipe and delivered into the air chamber in the presence of material delivered into said chamber directly from the screen.

2. The combination of a casing having a feed-inlet and outlet arranged substantially and vertically in line, a circular screen in the casing and with its central portion vertically in line with said feed-inlet and the entrance to the outlet, a rotary cutter operable in the cylinder, a fixed cutter-bar arranged in said feed-inlet, a pneumatic conveyer for creating a draft directly through the central portion of the cylinder to facilitate the separation of the reduced material, and an exterior branch of the draft-creating means having one end connecting with the casing in advance of the inlet to the screen and the opposite end connecting with the main conveyer at a point below the screen.

In testimony whereof I affix my signature in presence of two witnesses.

MILTON C. PETERS.

Witnesses:
T. W. FOWLER,
C. W. FOWLER.